United States Patent [19]

Asahara et al.

[11] 4,415,464
[45] Nov. 15, 1983

[54] FARADAY ROTATION GLASS

[75] Inventors: Yoshiyuki Asahara, Higashiyamato; Tetsuro Izumitani, Hino, both of Japan

[73] Assignee: Hoya Corporation, Tokyo, Japan

[21] Appl. No.: 357,447

[22] Filed: Mar. 12, 1982

Related U.S. Application Data

[63] Continuation of Ser. No. 967,766, Dec. 8, 1978, abandoned, which is a continuation of Ser. No. 868,245, Jan. 10, 1978, abandoned.

[30] Foreign Application Priority Data

Jan. 13, 1977 [JP] Japan ..................... 52-2717

[51] Int. Cl.$^3$ .................... C03C 3/16; C03C 3/18; C03C 3/30
[52] U.S. Cl. .................... 252/62.51; 501/44
[58] Field of Search .................. 106/47 D; 252/62.51; 501/44

[56] References Cited

U.S. PATENT DOCUMENTS

| 3,166,673 | 1/1965 | Vickery et al. | 252/62.51 |
| 3,318,652 | 5/1967 | Berger et al. | 252/62.51 |
| 3,320,170 | 5/1967 | Vickery et al. | 252/62.51 |
| 3,656,976 | 4/1972 | Izumitani | 501/44 |

Primary Examiner—Mark Bell
Attorney, Agent, or Firm—Sughrue, Mion, Zinn, Macpeak & Seas

[57] ABSTRACT

A Faraday rotation glass comprising, in mole %,

| $P_2O_5$ | 5 to 30% where up to 5/6 on a molar basis of the $P_2O_5$ can be replaced by $B_2O_3$; |
| $TbF_3$ | 11.4 to 45%; |
| $AlF_3$ | 0 to 25%; and |
| RF | at least 40% | where RF includes at least 3% $BaF_2$, 0 to 64% $MgF_2$, 0 to 32% NaF, 0 to 40% $SrF_2$, 0 to 26% $CaF_2$, 0 to 20% LiF and 0 to 20% KF.

2 Claims, 4 Drawing Figures

FARADAY ROTATION GLASS

This application is a continuation application of Ser. No. 967,766, filed Dec. 8, 1978 in turn a continuation application of Ser. No. 868,245, filed Jan. 10, 1978, both of which are now abandoned.

BACKGROUND OF THE INVENTION

1. Field of the Invention

This invention relates to a Faraday rotation glass having a large Verdet constant and a low nonlinear refractive index.

2. Description of the Prior Art

It is well known that glasses containing large quantities of paramagnetic rare earth element ions have a large Verdet constant and permit Faraday rotation to a high extent. However, with the exception of $Ce^{3+}$ ion and $Tb^{3+}$ ion, these ions have some sharp light absorption peaks in the visible and infrared regions, and they become an obstacle in using a Faraday rotation glass in an optical isolator, for example. In silicate and borate glasses, $Ce^{4+}$ is stable, and the Ce ion does not become paramagnetic. Moreover, since this ion has an absorption in the visible to ultraviolet regions, a phosphate glass is necessary in order to maintain the Ce ion in the trivalent state. On the other hand, the Tb ion is maintained in the trivalent state in a stable manner in silicate, borate and phosphate glasses, and the Tb ion always acts as a paramagnetic ion, and has no absorption in the visible and infrared regions. Accordingly, the Tb ion is most preferred as a component for producing a Faraday rotation glass.

When a Faraday rotation glass is used as an optical isolator element in a laser optical system, the glass must not only have a large Verdet constant, but also must have a low nonlinear refractive index ($n_2$) (i.e., the refractive index of the glass itself must be low) in order to prevent damage due to the self-focusing effect of laser beams. The Verdet constant of a glass containing $Tb^{3+}$ increases as the content of $Tb^{3+}$ ion increases, but simultaneously, the refractive index of such a glass also increases. Therefore, in order to obtain a glass having a large Verdet constant and a low refractive index, a base glass which has a low refractive index and in which a large quantity of $Tb^{3+}$ ion can be present must be selected. Of base glasses in which $Tb^{3+}$ ion can be present, borosilicate glasses have the highest refractive index and phosphate glasses have a lower refractive index. In order to decrease the refractive index further, the introduction of fluorides is necessary.

SUMMARY OF THE INVENTION

On the basis of the above concept it has now been found that by adding $TbF_3$ as paramagnetic compounds and monovalent and divalent fluorides to a $P_2O_5$ type glass having a low refractive index, the resulting fluorophosphate composition has a broad range of vitrification and a Faraday rotation glass having a low refractive index can be obtained from such a glass.

The present invention thus provides a Faraday rotation glass comprising, in mole %,

| | |
|---|---|
| $P_2O_5$ | 5 to 30% (up to 5/6, on a molar basis, of which can be replaced by $B_2O_3$); |
| $TbF_3$ | 11.4 to 45%; |
| $AlF_3$ | 0 to 25%; and |
| RF | at least 40%, | wherein RF includes at least 3% $BaF_2$, 0 to 64% $MgF_2$, 0 to 32% NaF, 0 to 40% $SrF_2$, 0 to 26% $CaF_2$, 0 to 20% LiF and 0 to 20% KF.

BRIEF DESCRIPTION OF THE ACCOMPANYING DRAWINGS

FIGS. 1 to 4 show examples of the vitrification range of examples of the glasses of this invention as shown in Tables 1 and 2 given hereinafter.

DETAILED DESCRIPTION OF THE INVENTION

The invention will be described by reference to Tables 1 and 2 showing examples of glasses of this invention and their characteristics and with reference to FIGS. 1 to 4 showing examples of the vitrification range.

Figure 3:
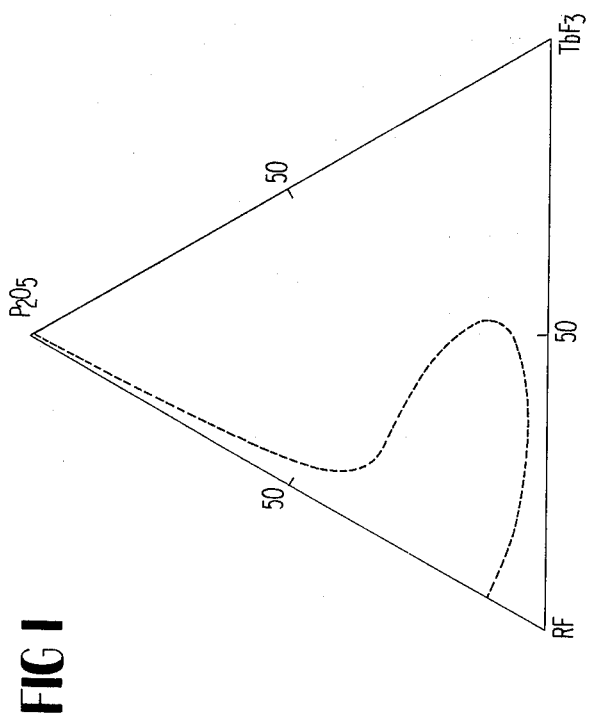
Figure 4:
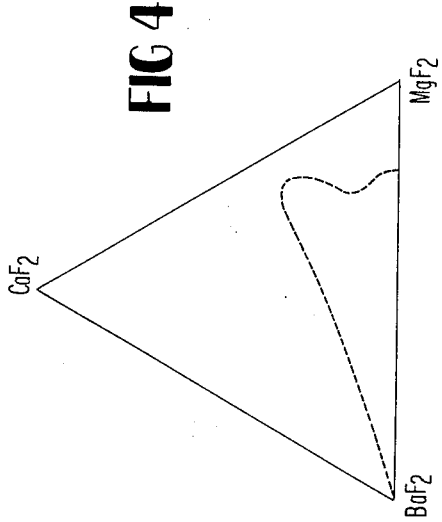
Figure 1:
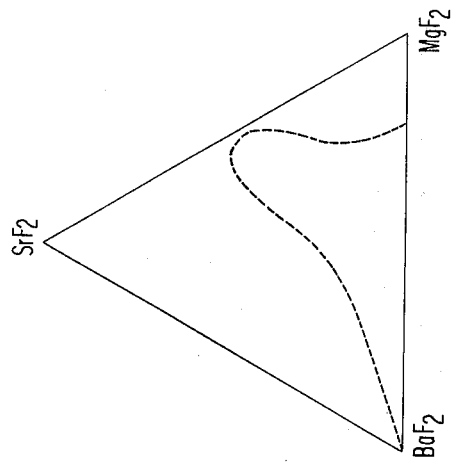
Figure 2:
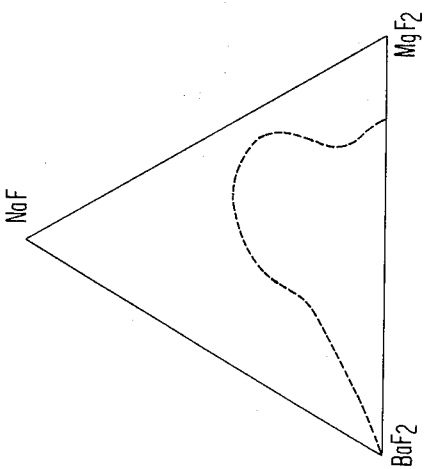

FIG. 1 shows kthe vitrification range of a $P_2O_5$-$TbF_3$-RF type composition; and FIGS. 2 to 4 show the mixing ratios of $BaF_2$, $MgF_2$ and either NaF, $SrF_2$ or $CaF_2$ with the proportions of $TbF_3$ and $P_2O_5$ being kept constant, and also the vitrification ranges of the resultant compositions.

TABLE 1

| Example No. | Composition (mole %) | | | | | | | | | | Verdet Constant at 6328 Å (min/Oe − cm) | Amount of Fluorine in Glass (wt. %) | | nd |
|---|---|---|---|---|---|---|---|---|---|---|---|---|---|---|
| | $P_2O_5$ | $TbF_3$ | $AlF_3$ | NaF | LiF | KF | $BaF_2$ | $MgF_2$ | $CaF_2$ | $SrF_2$ | | Charged in Raw Materials | Found in Glass | |
| 1 | 14.3 | 11.4 | — | 14.9 | — | — | 29.7 | 29.7 | — | — | −0.08 | 26.2 | 23.2 | 1.497 |
| 2 | 14.3 | 17.2 | — | 13.7 | — | — | 27.4 | 27.4 | — | — | −0.12 | — | — | 1.500 |
| 3 | 14.3 | 22.9 | — | 12.6 | — | — | 25.1 | 25.1 | — | — | −0.15 | 23.6 | 25.0 | 1.503 |
| 4 | 14.3 | 28.5 | — | 11.4 | — | — | 22.9 | 22.9 | — | — | −0.18 | — | — | 1.508 |
| 5 | 14.3 | 34.2 | — | 10.3 | — | — | 20.6 | 20.6 | — | — | −0.21 | 25.2 | 25.0 | 1.515 |
| 6 | 8.1 | 21.6 | — | 14.0 | — | — | 28.1 | 28.1 | — | — | −0.15 | — | — | 1.484 |
| 7 | 11.1 | 22.2 | — | 13.3 | — | — | 26.7 | 26.7 | — | — | −0.15 | 26.7 | 26.0 | 1.492 |
| 8 | 17.6 | 23.6 | — | 11.8 | — | — | 23.5 | 23.5 | — | — | −0.15 | 24.5 | 24.0 | 1.525 |
| 9 | 21.3 | 24.2 | — | 10.9 | — | — | 21.8 | 21.8 | — | — | −0.15 | — | — | 1.549 |
| 10 | 14.3 | 22.9 | — | 10.5 | — | — | 20.9 | 31.4 | — | — | −0.15 | — | — | 1.500 |
| 11 | 14.3 | 22.9 | — | — | — | — | 20.9 | 31.4 | — | 10.5 | −0.14 | — | — | 1.503 |
| 12 | 14.3 | 22.9 | — | — | — | — | 34.3 | 28.5 | — | — | −0.14 | — | — | 1.510 |
| 13 | 14.3 | 22.9 | — | — | — | — | 25.1 | 25.1 | 12.6 | — | −0.15 | — | — | 1.503 |
| 14 | 14.3 | 22.9 | — | 6.9 | — | — | 25.1 | 25.1 | — | 5.7 | −0.15 | — | — | 1.506 |
| 15 | 17.6 | 23.5 | — | — | — | — | 23.5 | 23.5 | 11.9 | — | −0.15 | — | — | 1.527 |
| 16 | 17.6 | 23.6 | — | 5.9 | — | — | 23.5 | 23.5 | — | 5.9 | −0.15 | — | — | 1.520 |
| 17 | 17.6 | 23.6 | — | — | 11.8 | — | 23.5 | 23.5 | — | — | −0.15 | — | — | 1.518 |
| 18 | 17.6 | 23.6 | — | — | — | 11.8 | 23.5 | 23.5 | — | — | −0.15 | — | — | 1.524 |
| 19 | 14.3 | 17.1 | 17.1 | 10.3 | — | — | 20.6 | 20.6 | — | — | −0.20 | — | — | 1.500 |

TABLE 1-continued

| Example No. | Composition (mole %) | | | | | | | | | Verdet Constant at 6328 Å (min/Oe − cm) | Amount of Fluorine in Glass (wt. %) | | nd |
|---|---|---|---|---|---|---|---|---|---|---|---|---|---|
| | $P_2O_5$ | $TbF_3$ | $AlF_3$ | NaF | LiF | KF | $BaF_2$ | $MgF_2$ | $CaF_2$ | $SrF_2$ | | Charged in Raw Materials | Found in Glass | |
| 20 | 11.1 | 16.7 | — | — | — | — | 72.2 | — | — | — | −0.11 | — | — | 1.480 |

TABLE 2

| Example No. | Composition (mole %) | | | | | | Verdet Constant at 6328 Å (min/Oe − cm) | Amount of Fluorine in Glass (wt. %) | | nd |
|---|---|---|---|---|---|---|---|---|---|---|
| | $P_2O_5$ | $B_2O_3$ | $TbF_3$ | NaF | $BaF_2$ | $MgF_2$ | | Charged in Raw Materials | Found in Glass | |
| 21 | 15.3 | 2.4 | 23.5 | 11.8 | 23.5 | 23.5 | −0.15 | — | — | 1.529 |
| 22 | 12.9 | 4.8 | 23.5 | 11.8 | 23.5 | 23.5 | −0.15 | 25.1 | 21.67 | 1.531 |
| 23 | 8.9 | 8.8 | 23.5 | 11.8 | 23.5 | 23.5 | −0.16 | 25.7 | 22.51 | 1.533 |
| 24 | 6.0 | 11.7 | 23.5 | 11.8 | 23.5 | 23.5 | −0.17 | — | — | 1.533 |
| 25 | 9.1 | 12.2 | 24.2 | 10.9 | 21.8 | 21.8 | −0.17 | — | — | 1.535 |

The Verdet constant, which represents the rotating ability that is most important to a Faraday rotation glass, is determined by the content of the paramagnetic compound $TbF_3$. If the content of $TbF_3$ is less than 5 mole %, vitrification is possible, but the resulting glass has a small Verdet constant and is useless as a Faraday rotation glass. However, by selecting monovalent and divalent components (to be generically referred to as RF), vitrification is possible with up to 45 mole % of $TbF_3$. The $TbF_3$ may be replaced by up to 25 mole % of $AlF_3$.

When the proportion of $TbF_3$ is constant, the amount of $P_2O_5$ which permits vitrification is determined relative to the RF component, and is within the range of 5 to 30 mole % by selecting the RF component. On the other hand, the types and combinations used in the RF component are important factors for determining the maximum content of $TbF_3$ for vitrification. When $BaF_2$, $MgF_2$, $SrF_2$, $CaF_2$, NaF, LiF and KF are used singly as the RF component, glasses containing $TbF_3$ and up to 10 mole % of NaF or up to 17 mole % of $BaF_2$ can be obtained. The other RF components, however, do not permit vitrification in the presence of $TbF_3$. When $BaF_2$ and $MgF_2$ are used in combination as the RF component, the vitrification range is broadened, and the range shown in FIG. 1 (as the RF component, $BaF_2$:$MgF_2$:NaF=2:2:1 molar ratio was used) can be obtained. In this case, $TbF_3$ can be included in the glass in an amount of up to 45 mole %.

When the amounts of $P_2O_5$, $TbF_3$ and RF are kept constant, a two-component combination of $BaF_2$ with either NaF, LiF, KF, $SrF_2$ or $CaF_2$ does not permit vitrification. However, when NaF, LiF, KF, $SrF_2$ or $CaF_2$ is added as a third RF ingredient to a combination of $BaF_2$ and $MgF_2$, stable glasses can be obtained with the compositions in the ranges shown in FIGS. 2 to 4 ($P_2O_5$ 13 mole %, $TbF_3$ 17 mole %).

Thus, when $BaF_2$ and $MgF_2$ are present together, their glass-forming amounts within the vitrification ranges of the entire composition, in accordance with the proportions shown in FIGS. 2 to 4, are a maximum of 84 mole % and a minimum of 3 mole % for $BaF_2$, and a maximum of 64 mole % and a minimum of 3 mole % for $MgF_2$. As the third RF ingredient, up to 32 mole % of NaF, up to 40 mole % of $SrF_2$, up to 26 mole % of $CaF_2$, up to 20 mole % of LiF, and up to 20 mole % of KF can be employed.

The glass can be further stabilized by replacing a part of the $P_2O_5$ with $B_2O_3$. Since the introduction of $B_2O_3$ increases the density of the glass, the amount of $TbF_3$ per unit volume increases, and consequently, the Verdet constant of the glass increases. Up to 5/6, on a molar basis, of the $P_2O_5$ can be replaced by $B_2O_3$, although replacement of all of the $P_2O_5$ with $B_2O_3$ leads to a failure of vitrification.

The glass of this invention can be obtained by first forming a glass batch so as to provide the glass composition comprising, in mole %, 5 to 30% $P_2O_5$ (where up to 5/6 on a molar bases of the $P_2O_5$ can be $B_2O_3$), 11.4 to 45% $TbF_3$, 0 to 25% $AlF_3$, and at least 40% RF, where RF includes at least 3% $BaF_2$, 0 to 64% $MgF_2$, 0 to 32% NaF, 0 to 40% $SrF_2$, 0 to 26% $CaF_2$, 0 to 20% LiF, and 0 to 20% KF. The glass batch is then melted in a platinum melter at about 1,000° to about 1,200° C. for about 10 to about 30 minutes while covering the melter with a platinum plate. As shown in the tables given hereinabove, the amounts of fluorine in the starting materials are substantially retained in the resultant glass even when this melting method is used.

While the invention has been described in detail and with reference to specific embodiments thereof, it will be apparent to one skilled in the art that various changes and modifications can be made therein without departing from the spirit and scope thereof.

What is claimed is:

1. A Faraday rotation glass consisting essentially of in mole %,

| | |
|---|---|
| $P_2O_5$ | 5 to 30% where up to 5/6 on a molar basis of the $P_2O_5$ can be replaced by $B_2O_3$; |
| $TbF_3$ | 11.4 to 45%; |
| $AlF_3$ | 0 to 25%; and |
| RF | at least 40% | where RF includes at least 3% $BaF_2$, 0 to 64% $MgF_2$, 0 to 32% NaF, 0 to 40% $SrF_2$, 0 to 26% $CaF_2$, 0 to 20% LiF and 0 to 20% KF.

2. The glass of claim 1 containing up to 10 mole % NaF or up to 17 mole % $BaF_2$.

* * * * *